US006516787B1

(12) United States Patent
Dutart et al.

(10) Patent No.: US 6,516,787 B1
(45) Date of Patent: Feb. 11, 2003

(54) USE OF EXHAUST GAS AS SWEEP FLOW TO ENHANCE AIR SEPARATION MEMBRANE PERFORMANCE

(75) Inventors: Charles H. Dutart, Washington, IL (US); Cathy Y. Choi, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/141,250

(22) Filed: May 8, 2002

(51) Int. Cl.⁷ .............................................. F02B 23/00

(52) U.S. Cl. ............. 123/539; 123/562.11; 123/568.17

(58) Field of Search ................................ 123/539, 585, 123/568.11, 568.17

(56) References Cited

U.S. PATENT DOCUMENTS

| | | | | |
|---|---|---|---|---|
| 4,883,023 A | * | 11/1989 | Tsang et al. | 123/25 A |
| 5,553,591 A | * | 9/1996 | Yi | 123/585 |
| 5,649,517 A | * | 7/1997 | Poola et al. | 123/585 |
| 5,702,999 A | * | 12/1997 | Mazanec et al. | 501/152 |
| 5,960,777 A | * | 10/1999 | Nemser et al. | 123/585 |
| 6,289,884 B1 | | 9/2001 | Blandino et al. | 123/585 |

\* cited by examiner

Primary Examiner—Marguerite McMahon
(74) Attorney, Agent, or Firm—Todd T Taylor

(57) ABSTRACT

An intake air separation system for an internal combustion engine is provided with purge gas or sweep flow on the permeate side of separation membranes in the air separation device. Exhaust gas from the engine is used as a purge gas flow, to increase oxygen flux in the separation device without increasing the nitrogen flux.

20 Claims, 5 Drawing Sheets

USE OF EXHAUST GAS AS SWEEP FLOW TO ENHANCE AIR SEPARATION MEMBRANE PERFORMANCE

The Government of the United States of America has rights in this invention pursuant to Contract No. DE-FC05-00OR22806 awarded by the U.S. Department of Energy.

TECHNICAL FIELD

The present invention relates to intake air separation systems for internal combustion engines, and more particularly, to an intake air separation system that includes an air separation membrane adapted to produce a stream of oxygen enriched air and nitrogen enriched air from the intake air in the presence of a stream of exhaust gas purge air.

BACKGROUND

Exhaust emission regulations have become increasingly restrictive, and internal combustion engine manufacturers are faced with competing interests in having to meet the emissions requirements while providing acceptable engine performance, including fuel efficiency. Exhaust emissions include visible smoke, particulate matter and oxides of nitrogen ($NO_x$). Particulate matter includes unburned hydrocarbons and soot, while $NO_x$ emissions are a somewhat indefinite mixture of oxides of nitrogen, which may include primarily NO and $NO_2$. Many approaches have been used to address emissions issues, including fuel injection, combustion control strategies and systems, after treatment systems and exhaust gas recirculation (EGR) systems.

Unfortunately, attempts at solving one issue can have a negative impact on others. For example, emission reduction systems often have a negative effect on fuel efficiency. To improve fuel efficiency, or power density, it is known to increase the amount of oxygen in the combustion chamber. This has been done in the past by pressurizing the combustion air provided to the combustion chamber. Pressurization of the combustion air increases the oxygen available for combustion. Turbochargers have been used for this purpose.

Particulates are formed in the combustion cycle primarily during relatively early portions of the cycle, but are usually burned as temperature and pressure increase during the combustion cycle. Particulates entering the exhaust stream tend to be formed in the latter part of the combustion cycle, as the pressure and temperature decrease. Increasing the oxygen content of intake air tends to reduce the quantity of unburned hydrocarbons by increasing the likelihood of complete combustion.

After treatment of exhaust gas can be used to reduce the amount of unburned hydrocarbons by continuing oxidation of the unburned hydrocarbons. A secondary air supply can be provided to the exhaust stream. The already high temperature of the exhaust stream will support further combustion with the introduction of additional oxygen in the exhaust gas stream. A trade-off occurs in that while particulate matter may be reduced, the further oxidation creates still higher temperatures in the exhaust system. The design of exhaust systems for these higher temperatures requires components able to withstand a much hotter environment. Such components are often heavy and expensive, and may require more frequent servicing.

Decreased fuel consumption and decreased particulate production often go hand-in-hand. However, at the same time, $NO_x$ production often increases. $NO_x$ forms when nitrogen mixes in a high temperature environment with excess oxygen not used in the combustion process. Therefore, while excess oxygen and high combustion temperatures are beneficial in reducing fuel consumption, the same combination is detrimental in terms of increased $NO_x$ formation. Engine manufactures must strike a delicate balance whereby $NO_x$ production, fuel consumption and particulate matter formation are controlled to meet emissions regulations and engine user demands.

$NO_x$ reduction has been accomplished using exhaust gas recirculation (EGR). By introducing EGR flow to the combustion chamber, the amount of available oxygen for formation of $NO_x$ is reduced. By reducing the amount of oxygen, the combustion process is slowed, thereby reducing the peek temperatures in the combustion chamber. EGR systems typically use exhaust gas, but may also use enriched nitrogen sources.

U.S. Pat. No. 6,289,884 "INTAKE AIR SEPARATION SYSTEM FOR AN INTERNAL COMBUSTION ENGINE" issued Sept. 18, 2001, discloses a method and system for intake air separation in an internal combustion engine. An intake air separation device utilizes a membrane to separate the intake air into a flow of oxygen enriched air and a flow of nitrogen enriched air. A purge air circuit is used to deliver a flow of sweep air or purge air to the intake air separation device, thereby increasing the effectiveness of the air separation. Several modifications of the system are shown, each using intake air as the purge air stream in the intake air separator. When intake air is used as the purge air stream, higher oxygen flux is achieved, but is coupled with higher nitrogen flux. If it is desired to yet further increase the oxygen flux, a larger membrane surface is required, requiring a larger separation device, and the increased oxygen flux will be coupled with a corresponding increased nitrogen flux. It may be desirable in some instances to increase oxygen flux in a relatively small separator device and/or to increase oxygen flux without a corresponding increase in nitrogen flux.

The present invention is directed to overcoming one or more of the problems as set forth above.

SUMMARY OF THE INVENTION

In one aspect of the invention, an intake air separation system is adapted for providing a nitrogen enriched air stream for a combustion process within an internal combustion engine having an exhaust system. The intake air separation system is provided with an intake air input adapted to receive intake air used in the combustion process for the engine. An intake air separation device is in flow communication with the intake air input, and is adapted for receiving the intake air and separating the intake air into an oxygen enriched air stream and a nitrogen enriched air stream. A purge gas conduit is in fluid communication with the intake air separation device and with the exhaust system, and is adapted for providing a stream of exhaust gas as purge gas flow to the intake air separation device, to increase efficiency of intake air separation.

In another aspect of the invention, a method of controlling an intake air flow for an internal combustion engine having an intake air system providing intake air to an intake manifold and one or more combustion chambers, and an exhaust gas system receiving exhaust gas flow from the combustion chambers is provided with steps of providing an intake air separating device; directing the intake air to the intake air separating device; in the air separating device, dividing the intake air into an oxygen enriched air stream and a nitrogen enriched air stream, and directing at least some of the flow of exhaust gas through the intake air separating device, as purge gas flow, to increase the efficiency of the step of dividing the intake air.

In still another aspect of the invention, an internal combustion engine is provided with an intake manifold, a combustion section including a plurality of combustion chambers, and an exhaust system including an exhaust conduit. An intake air separation system is adapted for providing a nitrogen enriched air stream for a combustion process within the plurality of combustion chambers. The intake air separation system is provided with an intake air input adapted to receive the intake air used in the combustion process for the engine. An intake air separation device is in flow communication with the intake air input, and is adapted for receiving the intake air and separating the intake air into an oxygen enriched air stream and a nitrogen enriched air stream. A purge gas conduit is in fluid communication with the intake air separation device and with the exhaust system, and is adapted for providing a purge gas flow of exhaust gas from the exhaust system to the intake air separation device, to increase efficiency of intake air separation;

DETAILED DESCRIPTION

Figure 1:
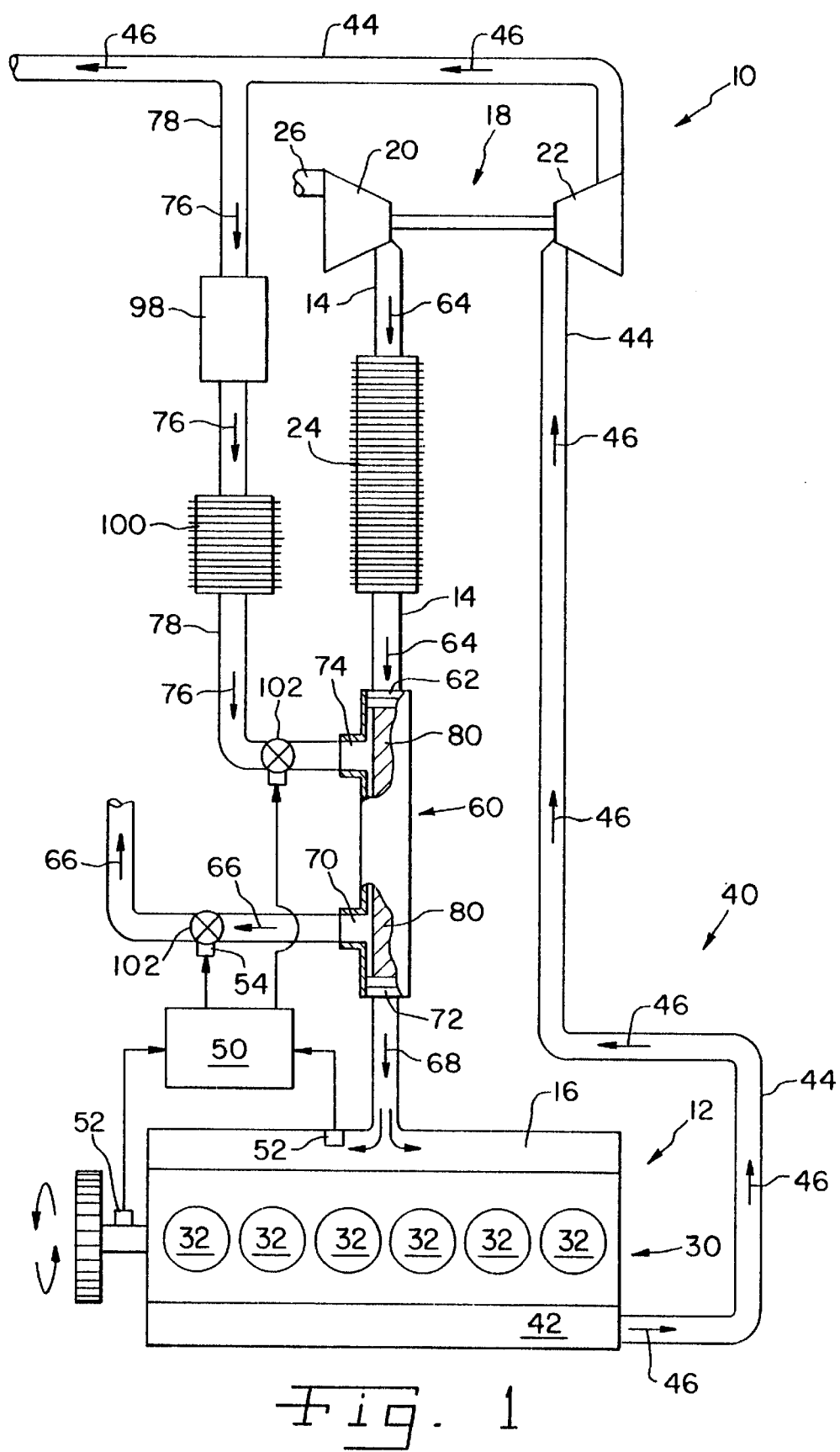
FIG. 1 is a schematic illustration of an internal combustion engine incorporating the intake air separation system of the present invention.

Turning now to the drawings, and particularly to FIG. 1, there is shown a schematic diagram of an intake air separation system 10 for a heavy duty diesel engine 12.

An intake side of diesel engine 12 includes an intake air conduit 14, an intake manifold 16 and an intake air pressurizing device 18, such as a turbocharger that includes an intake air compressor 20 connected to, and driven by an exhaust gas driven turbine 22. An inter-cooler or an air to air aftercooler (ATAAC) 24 is provided in intake air conduit 14, between compressor 20 and intake manifold 16. Air compressor 20 receives intake air from an intake air input 26.

Engine 12 further includes a main combustion section 30 which includes, among other elements, an engine block and a cylinder head forming a plurality of combustion chambers 32 therein. A fuel injector, cylinder liner, at least one intake port and corresponding intake valves, at least one exhaust port and corresponding exhaust valves and a reciprocating piston movable within each chamber 32 are provided or associated with each chamber 32.

An exhaust system 40 includes an exhaust manifold 42 or split exhaust manifolds, and one or more exhaust conduits 44 carrying an exhaust gas stream indicated by arrows 46 from exhaust manifold 42. Exhaust conduit 44 conducts exhaust gas stream 46 to turbine 22, for driving turbine 22 in known manner. Exhaust conduit 44 conducts exhaust gas stream 46 away from turbine 22 for further use, as will be described, and for subsequent discharge. Optionally, exhaust system 40 may further include one or more after treatment devices (not shown) such as particulate traps, $NO_x$ absorbers, oxidation and/or leaned $NO_x$ catalysts or other such devices.

An engine control module (ECM) 50 is provided for operatively controlling the fuel injection timing and air system valve operations in response to one or more measured or sensed engine operating parameters. For providing input data to ECM 50, one or more sensors 52 are provided, sensing various engine operating conditions at various engine locations. For example, one such sensor 52 is shown in intake manifold 16, but may be provided elsewhere in intake air system 10 to provide intake air pressure-data to ECM 50. Other sensors 52 may be temperature sensors, oxygen sensors, or the like, as those skilled in the art will understand readily, to provide the necessary input information relating to operating conditions of engine 12. In addition, engine 12 includes various valves, filters, actuators, bypass circuits and the like which are operatively coupled to ECM 50 by operators 54, to be controlled in response to a variety of engine operating conditions, such as engine speed, engine load, boost pressure conditions and the like.

While the present intake air separation system 10 is shown and described for use on a heavy duty six cylinder in-line four stroke direct injection diesel engine, numerous other engine types may be used, including alternate-fuel engines, gasoline engines, natural gas engines, two stroke engines, dual fuel engines and the like. The engine configurations may include in-line and/or v-type engines, as well as various modifications in the number of combustion chambers provided.

In the embodiment shown in FIG. 1, intake air conduit 14 is in flow communication with intake air input 26, compressor 20 of turbocharger 18 and ATAAC 24. Although intake air separation system 10 is shown and described in conjunction with a turbocharged diesel engine, system 10 is equally useful on engines with a variable geometry turbocharger (VGT) or other supercharged engines.

Intake air separation system 10 includes an air separation device 60 adapted for receiving substantially all of the required engine combustion air at an inlet 62 of separation device 60. Within separation device 60, the incoming combustion air stream, indicated by arrows 64, is separated into an oxygen enriched air stream designated by arrows 66 and a nitrogen enriched air stream designated by arrows 68, which leave separation device 60 via a permeate outlet 70 and a retentate outlet 72, respectively. A purge gas inlet 74 is also provided, to provided a purge gas, or sweep gas flow, indicated by arrows 76, to enhance the permeation effectiveness of separation device 60. Purge inlet 74 is connected via a purge gas conduit 78 to exhaust conduit 44, thereby supplying exhaust gas as purge gas flow 76. Purge gas flow 76 substantially combines with the permeate flow, or oxygen enriched air stream 66, leaving separation device 60 via permeate outlet 70.

Intake air separation device 60 preferably uses a plurality of selectively permeable separation membranes 80 that separate ambient intake air into streams of oxygen enriched air and nitrogen enriched air. Such membranes 80 are well-known in the art, as evidenced by the disclosures in U.S. Pat. No. 5,649,517 (Pools et al.); U.S. Pat. No. 5,526,641 (Sekar et al.); U.S. Pat. No. 5,640,845 (Ng et al; and U.S. Pat. No. 5,147,417 (Nemser); and a publication by K. Stork and R. Poola entitled "Membrane-Based Air Composition Control for Light Duty Diesel Vehicles", Center for Transportation Research Argonne National Library (Oct. 1998).

Figure 2C:
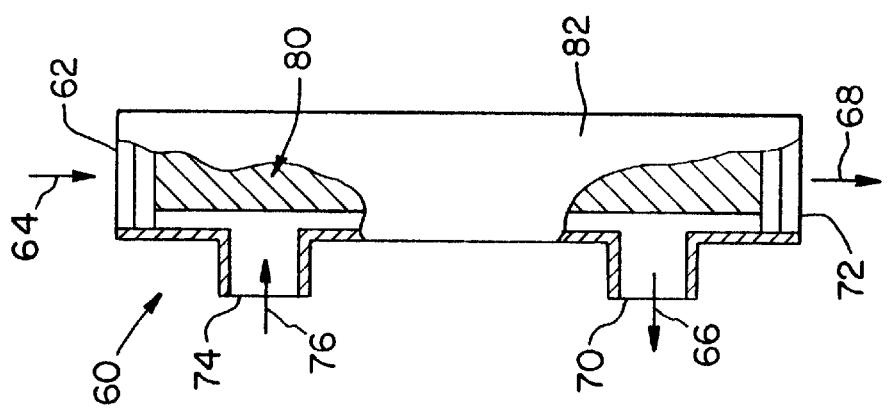
FIGS. 2a, 2b and 2c are partial cut-away views air separation devices contemplated for use in the embodiments of the present invention.
Figure 2B:
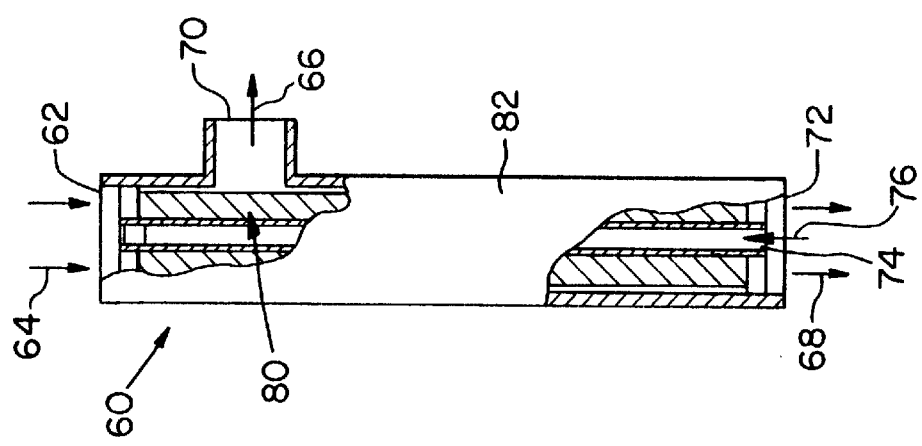
Figure 2A:
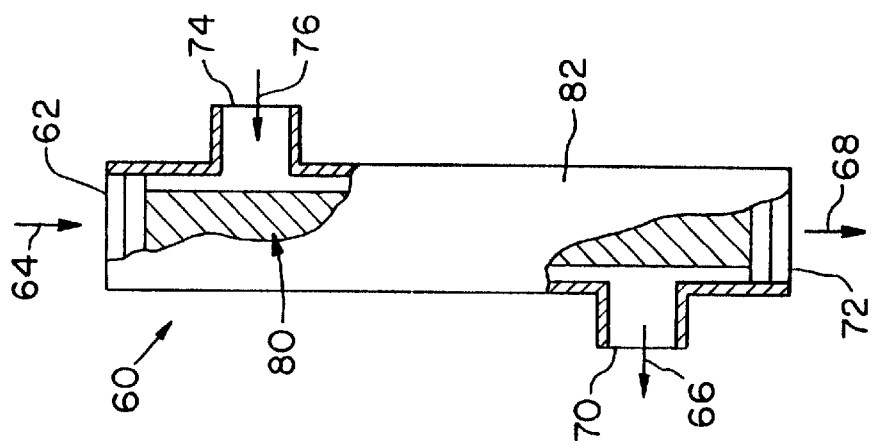

As seen in FIGS. 2a, 2b and 2c, air separation device 60 includes a housing or shell 82 having combustion air inlet 62, purge gas inlet 74, permeate outlet 70 and retentate outlet 72 therein. A plurality of selectively permeable elements including membranes 80 are disposed in a general longitudinal or helical orientation within housing 82, and are potted or sealed at each end. In the embodiment shown, membranes 80 are hollow, porous, coated tubes through which selected gases permeate outwardly relatively rapidly, while other gases permeate outwardly comparatively slowly, and tend to be retained in and transported the length of the tubes. Of importance to intake air separation system 10, oxygen trends to permeate membranes 80 more quickly than does nitrogen.

In the embodiments shown in FIG. 2a and FIG. 2b, combustion air stream 64 is introduced into intake air separation device 60 generally at an end of housing 82 and membranes 80, to flow through the lengths thereof. Oxygen tends to permeate membranes 80 readily, while nitrogen tends to permeate at a reduced rate relative to the permeation rate of oxygen. Purge gas flow 76 is introduced to air separation device 60 on the permeate sides of membranes 80. In the embodiment shown in FIG. 2b, a central purge air pathway 84 is provided through housing 82. The embodiments illustrated in FIGS. 2a, 2b and 2c are merely examples of suitable structures for air separation device 60, and other arrangements thereof suitable for the packaging constraints are possible.

A purge gas driver 90, that may be a passive device or active device, can be used for increasing the flow of exhaust gases through purge gas conduit 78. Those skilled in the art will understand readily that purge gas driver 90 can be many different devices, such as a purge air pump 92 (FIG. 3) or compressor 94 (FIG. 5) driven by turbine 22 of turbocharger 18; a blower 96 (FIG. 4) driven by engine 12, an electrically driven air mover, or other devices, such as a venturi (not shown).

To properly condition the exhaust gas for use in air separation device 60 as purge gas flow 76, a particulate filter 98, for removing contaminants, and a heat exchanger 100, for conditioning the temperature of the gas, are provided in purge gas conduit 78.

Further, flow control devices, such as valves 102 can be used to control flow of combustion air stream 64, oxygen enriched air stream 66, nitrogen enriched air stream 68 and purge gas flow 76. Exemplary valves 102 are shown in the drawings at various locations, and, again those skilled in the art will understand readily that more or fewer val used.

Figure 3:
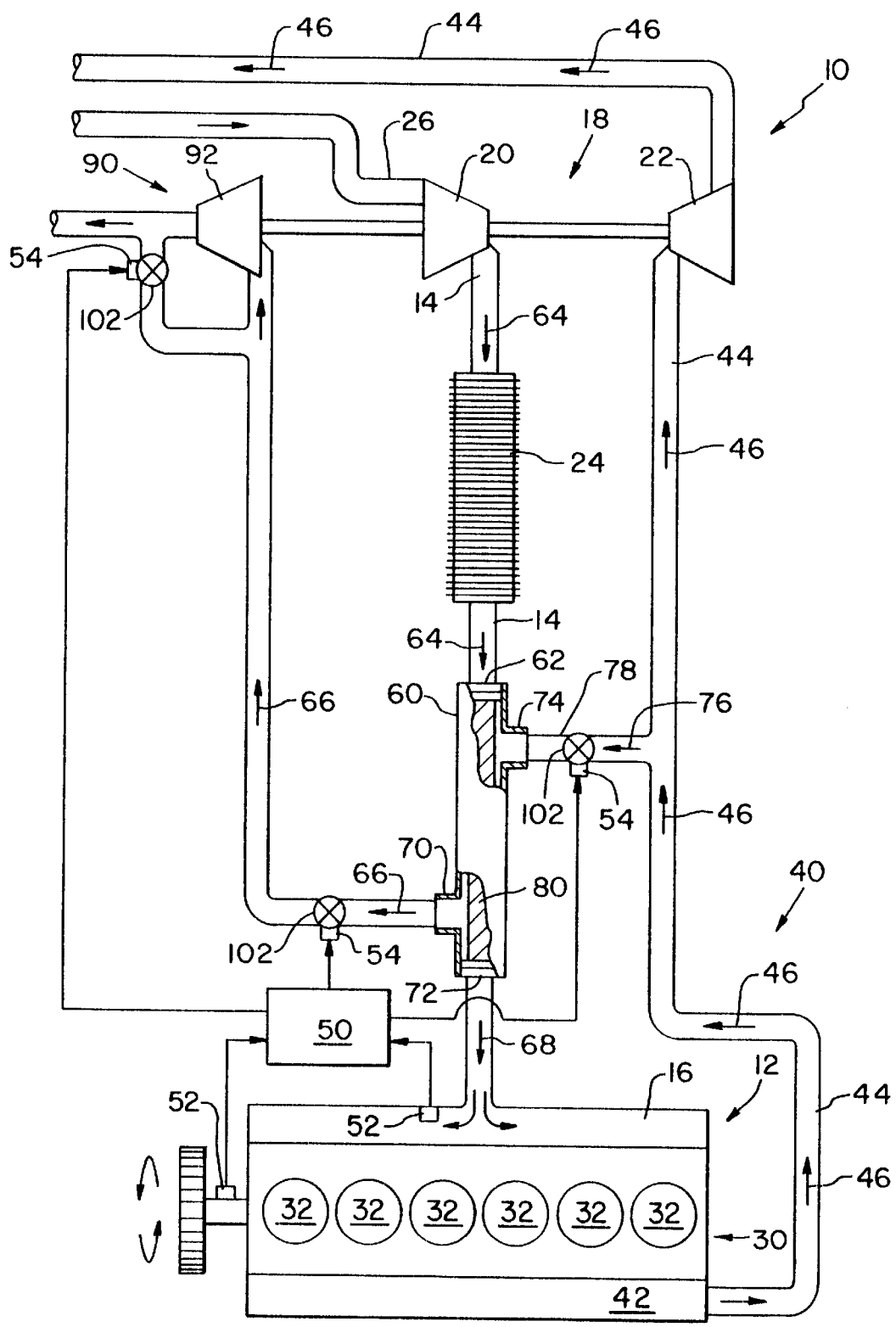
FIG. 3 is a schematic illustration of an alternate embodiment of the intake air separation system of the present invention.
Figure 4:
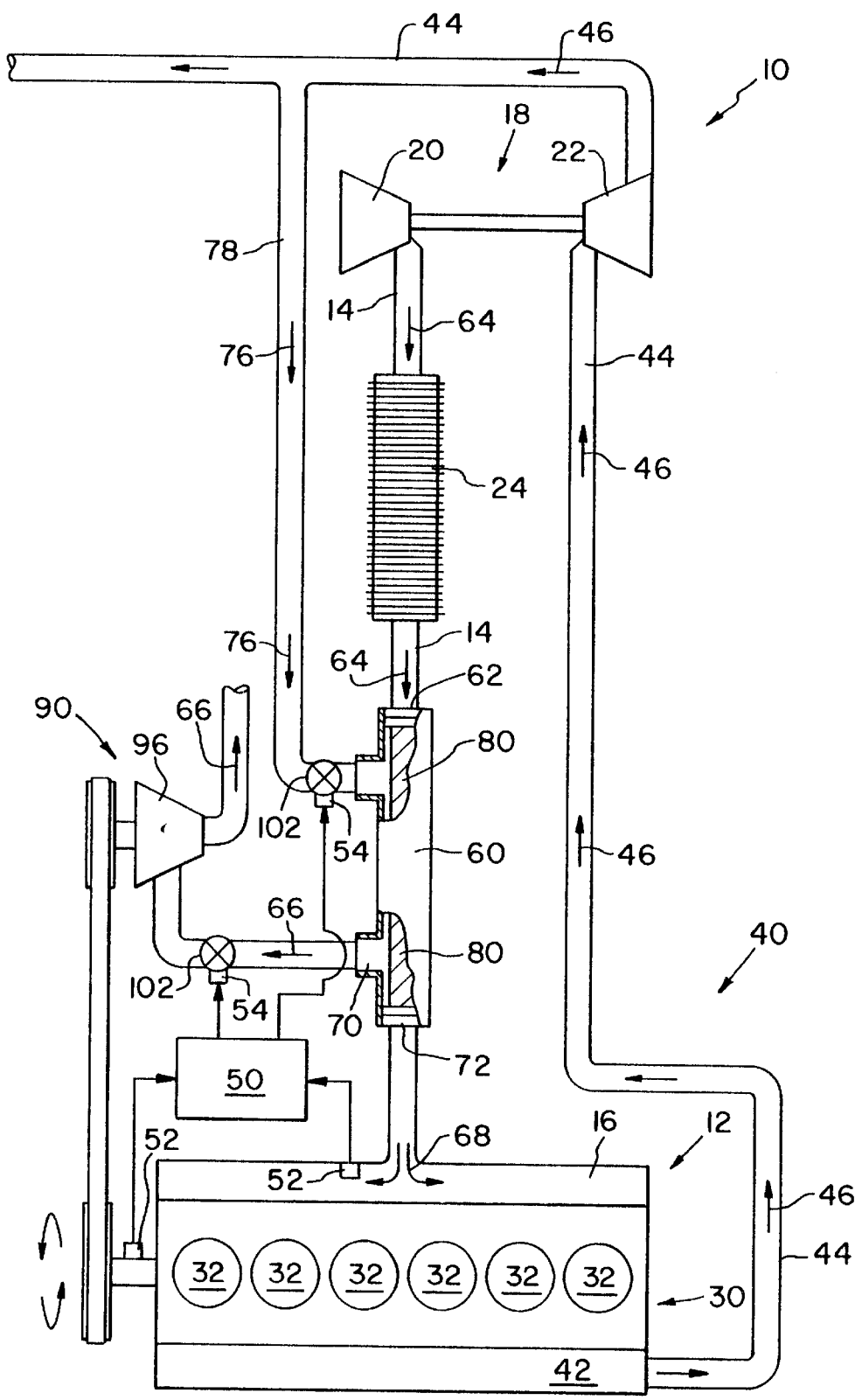
FIG. 4 is a schematic illustration of a further embodiment of the intake air separation system of the present invention.
Figure 5:
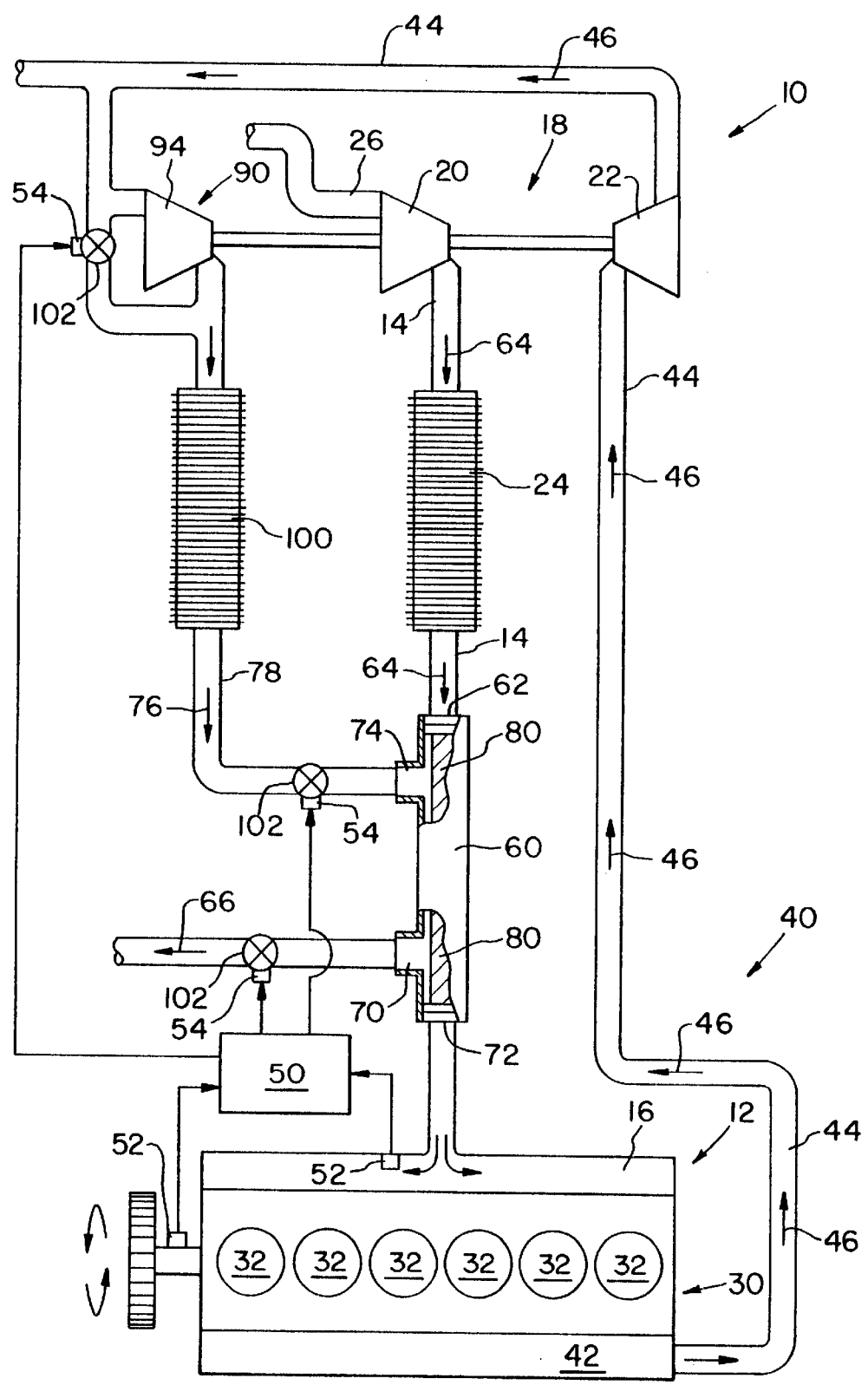
FIG. 5 is a schematic illustration of still another embodiment of the intake air separation system of the present invention.

FIGS. 1, 4 and 5 illustrate intake air separation systems 10 in which purge gas conduit 78 is connected in flow communication with exhaust conduit 44 of exhaust system 10 at a location downstream from turbine 22. Much of the energy in exhaust stream 46 is first used driving turbine 22. FIG. 3 illustrates an alternative embodiment in which purge gas conduit 78 is connected in flow communication with exhaust conduit 44 upstream of turbine 22. The embodiment illustrated in FIG. 3 may be advantageous when a split exhaust manifold 42 is used, with one exhaust manifold 42 connected in flow communication to purge gas conduit 78, and the other exhaust manifold or manifolds 42 connected directly to turbine 22.

Industrial Applicability

In the use and operation of an intake air separation system 10 of the present invention, fuel is supplied to combustion chambers 32 along with combustion air, as will be described, and the combination of fuel and combustion air is combusted in known manner. Exhaust gas from chambers 32 is discharged to exhaust manifold 42, and flows to exhaust conduit 44. Exhaust gas stream 46 in exhaust conduit 44 flows through turbine 22, supplying power to rotate turbine 22. In turn, turbine 22 drives compressor 20, in known manner Intake air is drawn in through intake air input 26 to compressor 20 and is compressed therein and discharged to intake conduit 14. Combustion air stream 64 flows through intake conduit 14 and ATAAC 24 to air separation device 60. Combustion air stream 64 enters device 60 at inlet 62, and flows through device 60 along membranes 80. The selective permeability of membranes 80 divides combustion air stream 64 into oxygen enriched air stream 66, which includes those gases having permeated membrane 80 and flowing to permeate outlet 70; and nitrogen enriched air stream 68, which includes those gases unable to permeate membrane 80 before the gases reach retentate outlet 72.

It should be understood that while the function of membranes 80 has been described as separating combustion air stream 64 into oxygen enriched air stream 66 and nitrogen enriched air stream 68, each of the separated air streams will include many gases other than oxygen and nitrogen, respectively. Oxygen enriched air stream 66 is more rich than nitrogen enriched air stream 68 in gases that readily permeate membranes 80, such as, for example, hydrogen, water vapors and carbon dioxide ill addition to oxygen. Nitrogen enriched air stream 68 is more rich than oxygen enriched air stream 66 in gases that do not permeate membranes 80 readily, such as, for example, carbon monoxide and nitrogen. Further, it is not a definitive separation of gases. For example, not all oxygen permeates membranes 80. Sufficient oxygen remains in nitrogen enriched air stream 68 to support combustion in combustion chambers 32.

Some exhaust gas from exhaust gas stream 46 enters purge gas conduit 78, becoming purge gas flow 76, and flows through purge gas conduit 78 to purge gas inlet 74 of air separation device 60. Purge gas flow 76 enters air separation device 60 on the permeate side of membranes 80. Purge gas flow 76, being exhaust gas from combustion in combustion chambers 32, has a low oxygen content-and a high nitrogen content.

Among the factors that influence the permeation rates of gases through membranes 80 are the partial gas pressures of the gases on opposite sides of membranes 80. By providing on the permeate side of membranes 80 a sweep or purge gas flow 76 which is high in nitrogen content and low in oxygen content, the permeation rates of oxygen and nitrogen through membranes 80 are influenced. By using purge gas flow 76 as described, a higher rate of oxygen permeation is achieved without an increase in rate of nitrogen permeation. Thus, particularly at high loads on engine 12, a higher oxygen flux can be achieved without an increase in nitrogen flux. Alternatively, less membrane 80 surface is required for a given retentate nitrogen purity requirement, with a corresponding reduction in fuel consumption due to the reduction in total mass flux across membranes 80. With the present invention, the size of air separation device 60 can be reduced while retaining the same oxygen flux as in a larger device having more surface are of membranes 80. Use of exhaust gas as described also minimizes loss of water vapor from the boost air stream, and may push water vapor into the boost air stream due to the high water vapor content of the exhaust gas stream. Further, $NO_x$ reduction is enhanced.

The present invention provides enhanced performance of an air separation membrane using sweep or purge gas flow made up of exhaust gases from combustion in the combustion chambers of an internal combustion engine. Thus, increased performance is achieved using a readily available purge gas flow without requiring an extraneous source of purge gas supply.

Other aspects, objects and advantages of this invention can be obtained from a study of the drawings, the disclosure and the appended claims.

What is claimed is:

1. An intake air separation system adapted for providing nitrogen enriched air for a combustion process within an internal combustion engine having an exhaust system, said intake air separation system comprising:
   an intake air input adapted to receive the intake air used in said combustion process for said engine;
   an intake air separation device in flow communication with said intake air input, and adapted for receiving said intake air and separating said intake air into an oxygen enriched air stream and a nitrogen enriched air stream;
   a purge gas conduit in fluid communication with said intake air separation device and with said exhaust system, and adapted for providing a stream of exhaust gas as purge gas flow to said intake air separation device, to increase efficiency of intake air separation;
   a permeate outlet in fluid communication with said intake air separation device, and adapted to receive said oxygen enriched air stream and said purge gas flow; and
   a retentate outlet in fluid communication with said intake air separation device and said intake manifold, said retentate outlet adapted to provide said nitrogen enriched air stream to said intake manifold for use in said combustion process.

2. The intake air separation system of claim 1, including a turbocharger having a compressor adapted to provide intake air to said intake air separation device and a turbine connected in fluid flow communication in said exhaust system, and said purge gas conduit connected to said exhaust system of said engine downstream of said turbine.

3. The intake air separation system of claim 2, including a particulate filter in said purge gas conduit.

4. The intake air separation system of claim 2, including a heat exchanger in said purge gas conduit for cooling exhaust gas flowing through said purge gas conduit.

5. The intake air separation system of claim 4, including a particulate filter in said purge gas conduit.

6. The intake air separation system of claim 5, including a purge gas driver in fluid flow communication with said purge gas conduit.

7. The intake air separation system of claim 1, said purge gas conduit including a particulate filter.

8. The intake air separation system of claim 1, said purge gas conduit including a heat exchanger for cooling exhaust gas flowing through said purge gas conduit.

9. A method of controlling an intake air flow in an internal combustion engine, said engine having an intake air system adapted for providing intake air to an intake manifold and one or more combustion chambers, and an exhaust gas system receiving exhaust gas flow from said combustion chambers, said method comprising the steps of:
   providing an intake air separation device;
   directing the intake air to the intake air separation device;
   in the air separation device, dividing the intake air into an oxygen enriched air stream and a nitrogen enriched air stream, and
   directing at least some of the flow of exhaust gas through said intake air separation device, as purge gas flow, to increase the efficiency of said step of dividing the intake air.

10. The method of claim 9, including cooling the flow of exhaust gas prior to said step of directing the flow of exhaust gas through the intake air separation device.

11. The method of claim 9, including filtering particulates from the exhaust gas prior to said step of directing the flow of exhaust gas through the intake air separation device.

12. The method of claim 11, including cooling the flow of exhaust gas prior to said step of directing the flow of exhaust gas through the intake air separation device.

13. An internal combustion engine comprising:
   a combustion section including a plurality of combustion chambers;
   an exhaust system including an exhaust conduit;
   an intake manifold;
   an intake air separation system adapted for providing a nitrogen enriched air stream for a combustion process within said plurality of combustion chambers, said intake air separation system comprising
   an intake air input adapted to receive the intake air used in said combustion process for said engine;
   an intake air separation device in flow communication with said intake air input, and adapted for receiving said intake air and separating said intake air into an oxygen enriched air stream and a nitrogen enriched air stream;
   a purge gas conduit in fluid flow communication with said intake air separation device and with said exhaust system, and adapted for providing a purge gas flow of exhaust gas from said exhaust system to said intake air separation device, to increase efficiency of intake air separation;
   a permeate outlet in fluid flow communication with said intake air separation device, and adapted to receive said oxygen enriched air stream and said purge gas flow; and
   a retentate outlet in fluid flow communication with said intake air separation device and said intake manifold, said retentate outlet adapted to provide said nitrogen enriched air stream to said intake manifold for use in said combustion process.

14. The internal combustion engine of claim 13, including a turbocharger have a compressor providing pressurized intake air to said intake air separation device, and a turbine powered by exhaust gas flow through said exhaust conduit; said purge gas conduit connected in fluid flow communication to said exhaust conduit downstream from said turbocharger turbine.

15. The internal combustion engine of claim 14, including a purge gas driver in fluid flow communication with said purge gas conduit.

16. The internal combustion engine of claim 14, including a particulate filter in said purge gas conduit.

17. The internal combustion engine of claim 14, including a cooler in said purge gas conduit.

18. The internal combustion engine of claim 17, including a particulate filter in said purge gas conduit.

19. The internal combustion engine of claim 18, including a purge gas driver in fluid flow communication with said purge gas conduit.

20. The internal combustion engine of claim 13, including a purge gas driver in fluid flow communication with said purge gas conduit.

* * * * *